(12) United States Patent
Tiemeyer et al.

(10) Patent No.: US 12,110,973 B2
(45) Date of Patent: Oct. 8, 2024

(54) VALVE SYSTEM

(71) Applicant: HELLA GmbH & Co. KG KGaA, Lippstadt (DE)

(72) Inventors: Sebastian Tiemeyer, Dortmund (DE); Verena Sundermeier, Delbrueck (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 181 days.

(21) Appl. No.: 17/842,965

(22) Filed: Jun. 17, 2022

(65) Prior Publication Data

US 2022/0316609 A1  Oct. 6, 2022

Related U.S. Application Data

(63) Continuation of application No. PCT/EP2020/084646, filed on Dec. 4, 2020.

(30) Foreign Application Priority Data

Dec. 19, 2019 (DE) ............ 10 2019 135 042.5
Jan. 20, 2020 (DE) ............ 10 2020 101 186.5
Mar. 16, 2020 (DE) ............ 10 2020 107 125.6

(51) Int. Cl.
*F16K 11/16* (2006.01)
*F16K 31/528* (2006.01)
*F16K 31/53* (2006.01)

(52) U.S. Cl.
CPC ........ *F16K 11/165* (2013.01); *F16K 31/5284* (2013.01); *F16K 31/535* (2013.01)

(58) Field of Classification Search
CPC .. F16K 11/165; F16K 31/535; F16K 11/0856; F16K 11/0853; F16K 3/26
See application file for complete search history.

(56) References Cited

U.S. PATENT DOCUMENTS 4,964,434 A   10/1990  Bieri
8,757,110 B2  6/2014   Treibe et al.
(Continued)

FOREIGN PATENT DOCUMENTS

DE    82102 C      7/1895
DE    4000360 A1   8/1990
(Continued)

OTHER PUBLICATIONS

International Search Report dated Feb. 26, 2021 in corresponding application PCT/EP2020/084646.

*Primary Examiner* — Kelsey E Cary
(74) *Attorney, Agent, or Firm* — Muncy, Geissler, Olds & Lowe, P.C.

(57) ABSTRACT

The present invention relates to a valve system, comprising a first valve and a second valve, wherein both valves each have a housing with a plurality of housing openings, and a valve body arranged rotatably in the housing with at least one connection channel for providing a fluid connection of at least two of the housing openings, characterized in that the valve body of the first valve and the valve body of the second valve are mechanically coupled with each other by means of a coupling device of the valve system, wherein the coupling device is designed in such a way that the valve bodies can be rotated jointly by means of the coupling device when the valve system is in a first operating state and rotated independently of each other by means of the coupling device when the valve system is in a second operating state.

12 Claims, 14 Drawing Sheets

(56) References Cited

U.S. PATENT DOCUMENTS

| | | |
|---|---|---|
| 9,382,833 B2 | 6/2016 | Morein |
| 9,404,594 B2 | 8/2016 | Morein |
| 10,125,878 B2 | 11/2018 | Bartonek |
| 2006/0118066 A1 | 6/2006 | Martins |
| 2015/0354714 A1* | 12/2015 | Morein ................ F16K 11/076 137/625.46 |
| 2016/0281585 A1 | 9/2016 | Muizelaar et al. |
| 2016/0341331 A1* | 11/2016 | Lueders ................ F16K 31/535 |

FOREIGN PATENT DOCUMENTS

| | | |
|---|---|---|
| DE | 102006059029 A1 | 6/2008 |
| DE | 102007019064 B3 | 8/2008 |
| DE | 102009020187 A1 | 11/2010 |
| DE | 102012022238 A1 | 5/2014 |
| DE | 102015210157 A1 | 12/2015 |
| DE | 112014003423 T5 | 5/2016 |

* cited by examiner

VALVE SYSTEM

This nonprovisional application is a continuation of International Application No. PCT/EP2020/084646, which was filed on Dec. 4, 2020, and which claims priority to German Patent Application No. 10 2019 135 042.5, which was filed in Germany on Dec. 19, 2019, and German Patent Application No. 10 2020 101 186.5, which was filed in Germany on Jan. 20, 2020, and German Patent Application No. 10 2020 107 125.6, which was filed in Germany on Mar. 16, 2020, and which are all herein incorporated by reference.

BACKGROUND OF THE INVENTION

Field of the Invention

The present invention relates to a valve system.

Description of the Background Art

Valve systems are already known from the prior art in numerous design variants. The known valve systems comprise a first valve and a second valve, wherein both valves each have a housing with a plurality of housing openings, each for providing a fluid connection to an external flow channel for a fluid, and a valve body rotatable in the housing about a rotary axis with at least one connection channel for providing the fluid connection of at least two of the housing openings of the housing, and wherein between the housing and the valve body a seal with seal openings corresponding to the housing openings in the housing is arranged for sealing the fluid connections from an open environment.

SUMMARY OF THE INVENTION

It is therefore an object of the present invention to provide an improved valve system.

This object is achieved in an exemplary embodiment by a valve system, which is characterized in that the valve body of the first valve and the valve body of the second valve are mechanically coupled with each other via a coupling device of the valve system, wherein the coupling device is designed such that the valve body of the first valve and the valve body of the second valve are mechanically coupled with each other by means of a coupling device of the valve system, wherein the coupling device is designed in such a way that the valve bodies can be rotated jointly by means of the coupling device when the valve system is in a first operating state and can be rotated independently by means of the coupling device when the valve system is in a second operating state. The subclaims relate to advantageous further developments of the invention.

A significant advantage of the valve system according to the invention is in particular that the valve system is improved. Due to the inventive formation of the valve system, it is possible to control a plurality of external flow channels of a fluid system with, for example, a plurality of fluid circuits in a simple manner in terms of design and circuit technology. By means of the invention, it is thus possible to form a valve system suitable for a variety of combinations between fluid-connected and fluid-separable external flow channels for a plurality of fluid systems, with at the same time less effort in terms of design, manufacturing and circuit technology. Accordingly, the installation effort and costs as well as the required installation space are significantly reduced.

In principle, the valve system can be freely selected according to type, function, material, dimensioning and arrangement within wide suitable limits.

The coupling device can have a freewheel arrangement, which is designed in such a way that the valve bodies, in a freewheel state of the freewheel arrangement at a rotation of the valve body about the respective axis of rotation, are not connected at a predetermined angle of rotation range in terms of torque. In this way, the valve system according to the invention can be realized in a particularly simple and compact manner in terms of design and production technology.

The freewheel arrangement can have at least one groove and at least one protrusion corresponding to the groove and engaging in the groove, wherein the groove and the protrusion are each arranged on one of the two valve bodies and/or on at least one transmitter connected with at least one of the two valve bodies in a power-transmitting manner. As a result, the freewheel arrangement of the coupling device is realized in a simple and robust manner in terms of design and production technology.

The coupling device can have at least one gear pairing with a first gear and a second gear, wherein the two gears are each arranged on one of the two valve bodies and/or on at least one transmitter connected with at least one of the two valve bodies in a power-transmitting manner. In this way, a proper torque transmission between the first valve body on one side and the second valve body on the other side is ensured even under difficult environmental conditions, such as high ambient temperatures or the like, so that the function of the valve system according to the invention is guaranteed. The term gear is to be interpreted broadly and also includes designs in which only a part of a wheel circumference, inside or outside, is provided with a toothing.

The valve body and the housing of the first and/or second valve can have corresponding latching agents, wherein the latching agents are designed in such a way that this valve body in the freewheel state of the freewheel arrangement is locked with this housing and that in a power transmission state of the freewheel arrangement, in which a torque can be transmitted between the two valve bodies by means of the coupling device, the locking of the latching agents is released. This ensures that the valve body not driven in the freewheel state of the freewheel arrangement does not rotate in an undesirable manner, for example due to friction or the like, along with the valve body of the first valve driven in the freewheel state of the freewheel arrangement and instead rotates in the power transmission state of the freewheel arrangement in the desired manner along with the driven valve body.

The first valve and/or the second valve can be designed as a multi-way valve, preferably that at least one of the at least one connection channels of the multi-way valve is formed as a curved, preferably arc-shaped, recess of the valve body. In this way, by means of the valve system according to the invention, even very complex fluid systems can be realized in terms of design and circuit technology as well as in a space-saving manner.

The multi-way valve can have at least one plane with a plurality of connection channels, preferably that one of the connection channels of this plane is formed as a central channel, wherein the remaining connection channels of this plane are each arranged on both sides of the central channel. As a result, the aforementioned embodiment is realized in a particularly simple way in terms of design.

The multi-way valve can have a plurality of planes, wherein the individual planes are arranged parallel to each other, preferably that at least one of the at least one connection channels extends over at least two planes, particularly preferably that this connection channel is formed as a central channel. In this way, the multi-way valve can be used even more flexibly, so that even more complex fluid systems can be switched with this multi-way valve. By means of the preferred and in particular by means of the particularly preferred embodiment of this further development, a multi-plane connection and thus a connection of the housing openings assigned to these planes in each case is possible in a simple manner in terms of design and manufacturing technology.

The valve system can be designed in such a way that three external fluid circuits are controllable simultaneously by means of the valve system, wherein each of the three external fluid circuits is provided with a fluid connection to at least two different housing openings by means of the external flow channels, preferably that at least one of the three external fluid circuits has an external flow channel formed as a bypass channel for at least one component of this external fluid circuit, wherein the bypass channel is provided with a fluid connection separately to one of the housing openings of the valve system. As a result, it is possible, for example, to control even very complex fluid systems with fluid circuits only with a single multi-way valve of the valve system according to the invention.

The housing of the first valve and the housing of the second valve can be at least partially, preferably completely, formed as a common housing. In this way, the design of the valve system and its production is considerably simplified. For example, it is possible to reduce the number of components, for example the number of seals, since individual seals can be structurally combined into a single combined seal for both the first and the second valves.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
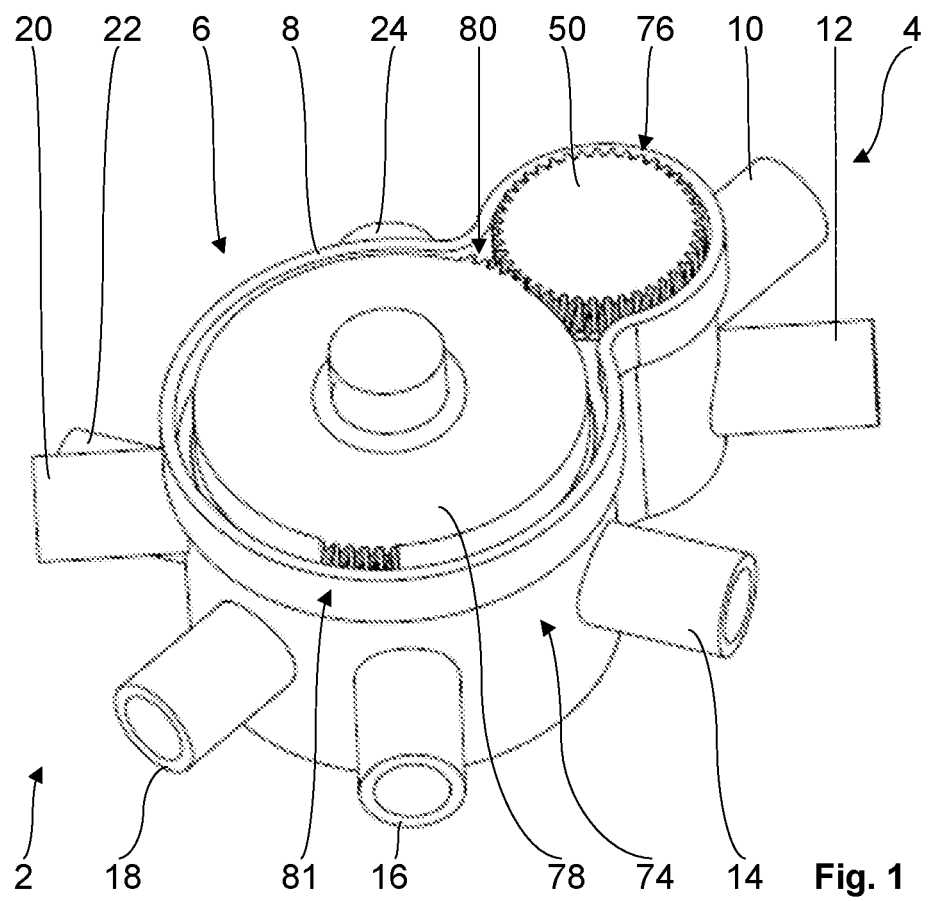
FIG. 1 shows an exemplary embodiment of the valve system according to the invention in a perspective representation.

FIGS. 1 to 4 represent an exemplary embodiment of the valve system according to the invention purely by way of example.

The valve system 2 comprises a first valve 4 and a second valve 6, wherein both valves 4, 6 comprise a common housing 8 with a plurality of housing openings 10, 12, 14, 16, 18, 20, 22, 24, each for fluid connection with an external fluid channel 30, 32, 34, 36, 38, 40, 42, 44 for a fluid namely a coolant, and a valve body 50, 52 arranged rotatably in the housing 8 about a rotation axis 46, 48 with at least one connection channel 54, 56, 58, 60, 62, 64, 66 for the fluid connection of at least two of the housing openings 10, 12, 14, 16, 18, 20, 22, 24 of the housing 8, and wherein between the housing 8 and the valve body 50, 52 a seal with seal openings corresponding to the housing openings 10, 12, 14, 16, 18, 20, 22, 24 in the housing 8 is arranged for sealing the fluid connections from an open environment. The two valves 4, 6 are also connected with each other in a fluid connection, wherein this fluid-conducting, i.e., coolant-conducting connection is not shown in more detail in FIGS. 1 to 4.

In the present embodiment, the housing of the first valve 4 and the housing of the second valve 6 are completely formed as a common housing, namely the housing 8. See FIGS. 1 and 2a.

Figure 2B:
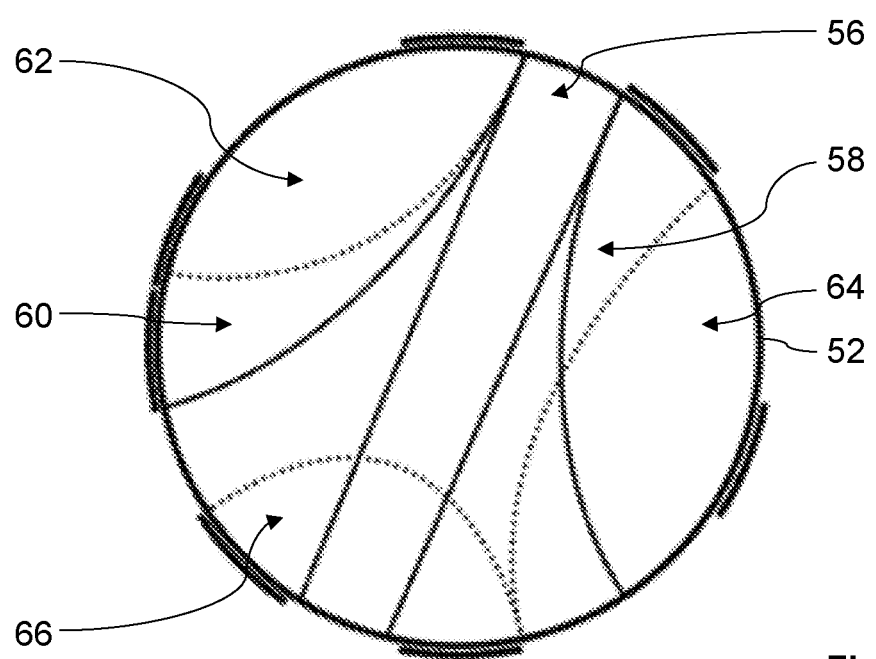
FIG. 2b shows the exemplary embodiment in a partial, cut top view.

Furthermore, the second valve 6 is formed as a multi-way valve, wherein at least one of the connection channels 56, 58, 60, 62, 64, 66 of the second valve 6 formed as a multi-way valve 6 is formed as a curved, preferably arc-shaped, recess of the valve body 52. Here, the connection channels 58, 60, 62, 64, 66 are each formed with a curved recess of the valve body 52. The second valve 6, designed as a multi-way valve, has a first plane and a second plane, each with a plurality of connection channels, wherein the connection channel 56 is formed as a central channel on the first plane and the remaining connection channels 58, 60 of the first plane are each arranged on both sides of the central channel 56. The first plane thus comprises the connection channels 56, 58, 60, while the second plane comprises the connection channels 62, 64, 66. The first plane is arranged in the image plane of FIG. 1 below the second plane. The first and second levels are arranged parallel to each other. In contrast to the present embodiment, other embodiments of the invention are also conceivable, in which at least one of the at least one connection channel extends over at least two planes, particularly preferably that this connection channel is formed as a central channel. The connection channels 56, 58, 60, 62, 64, 66 of the valve body 52 of the second valve 6 are shown for sake of clarity in FIG. 2b, wherein the connection channels 56, 58, 60 of the first plane in FIG. 2b are shown with solid lines and the connection channels 62, 64, 66 of the second plane are shown in FIG. 2b with dotted lines.

The valve system 2 is designed in such a way that by means of the valve system 2 simultaneously three external fluid circuits 68, 70, 72 are controllable, wherein each of the three external fluid circuits 68, 70, 72 is in fluid connection with at least two different housing openings 10, 12, 14, 16, 18, 20, 22, 24, by means of the external flow channels 30, 32, 34, 36, 38, 40, 42, 44, wherein at least one of the three external fluid circuits 68, 70, 72 has an external flow channel 30, 42 formed as a bypass channel for at least one component of this external fluid circuit 68, 72, wherein the bypass channel is separately provided with a fluid connection with one of the housing openings 10, 22 of the valve system 2.

According to the invention, the valve body 50 of the first valve 4 and the valve body 52 of the second valve 6 are mechanically coupled with each other by means of a coupling device 74 of the valve system 2, wherein the coupling device 74 is designed in such a way that the valve bodies 50, 52 can be rotated jointly by means of the coupling device 74 when the valve system 2 is in a first operating state and can be rotated independently by means of the coupling device 74 when the valve system 2 is in a second operating state. See FIGS. 1 and 2a as well as FIGS. 3a to 3h in a synopsis.

For this purpose, the coupling device 74 has a gear 76 formed on the valve body 50 of the first valve 4 and two arc-shaped gear segments 80, 81 arranged on a transmitter 78 connected with the valve body 52 of the second valve 6 in a power-transmitting manner. In the present embodiment, the transmitter 78 is formed as a disc. For the purpose of forming a freewheel arrangement, the transmitter 78 designed as a disc has two oppositely arranged protrusions 82, each of which engages in a corresponding arc-shaped groove 84 of the valve body 52 of the second valve 6. The freewheel arrangement of the coupling device 74 described in this way is designed in such a way that in a freewheel state of the freewheel arrangement, at a rotation of the valve body 50 about the axis of rotation 46 in a predetermined rotation angle range, the valve body 50 of the first valve 4 is not connected in a torque-transmitting manner with the valve body 52 of the second valve 6. The same applies to the valve body 52 of the second valve 6, which in the freewheel state of the freewheel arrangement at a rotation of the valve body 52 about the rotary axis 48 in a predetermined rotation angle range, is also not connected in a torque-transmitting manner with the valve body 50 of the first valve 4. This is explained in more detail below, in particular on the basis of FIGS. 3a to 3h.

In the following, the functioning of the valve system according to the invention is explained in more detail according to the first embodiment based on FIGS. 1 to 4.

Figure 2A:
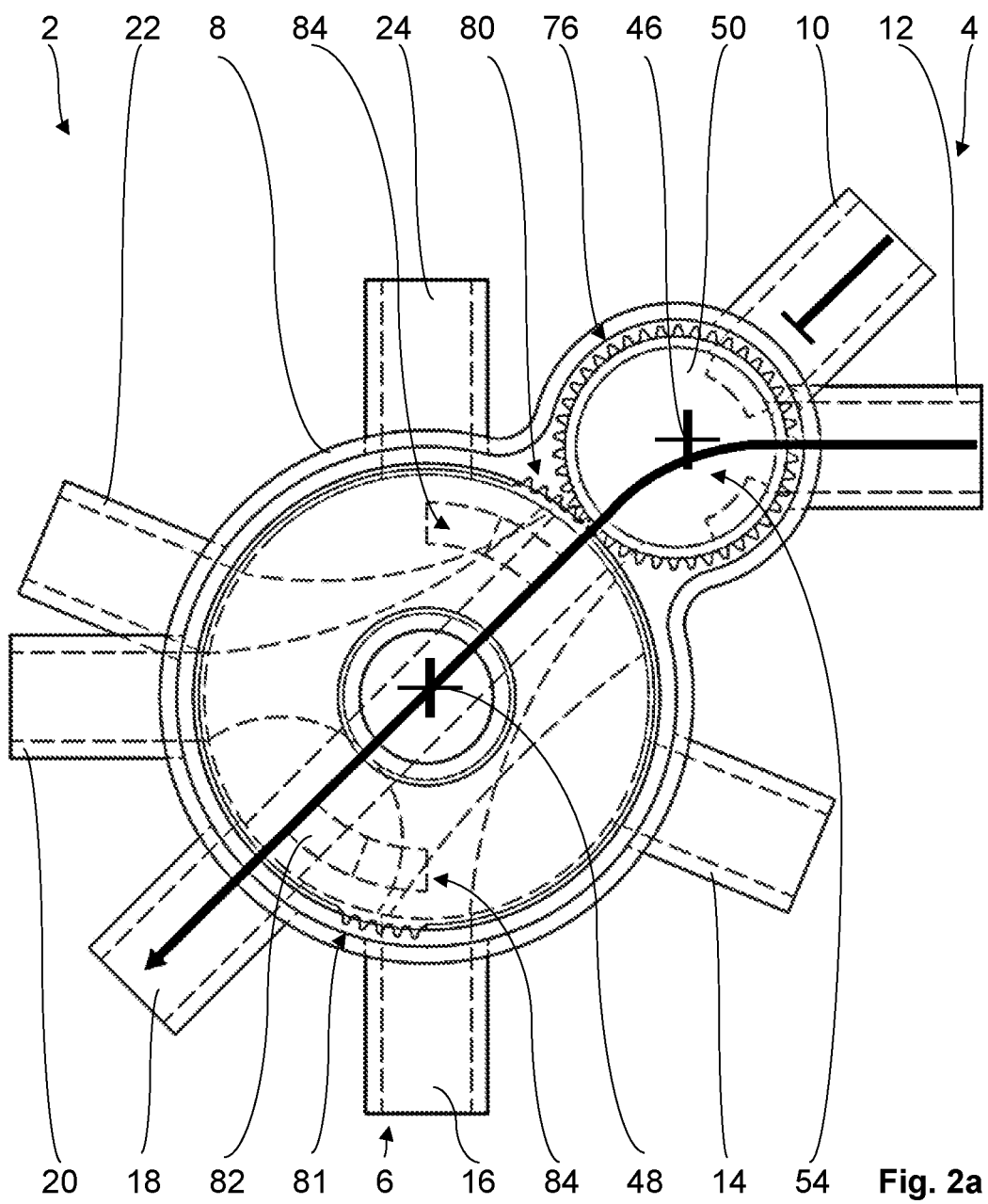
FIG. 2a shows the exemplary embodiment in a top view.

The transmitter 78 can be, for example, rotated about the axis of rotation 48 in a manner known to those in the art by means of an actuator, which is controlled by means of a controller. In FIG. 2a, the rotation axes 46, 48 run perpendicular to the image plane of FIG. 2a.

Figures 3A, 3B, 3C:
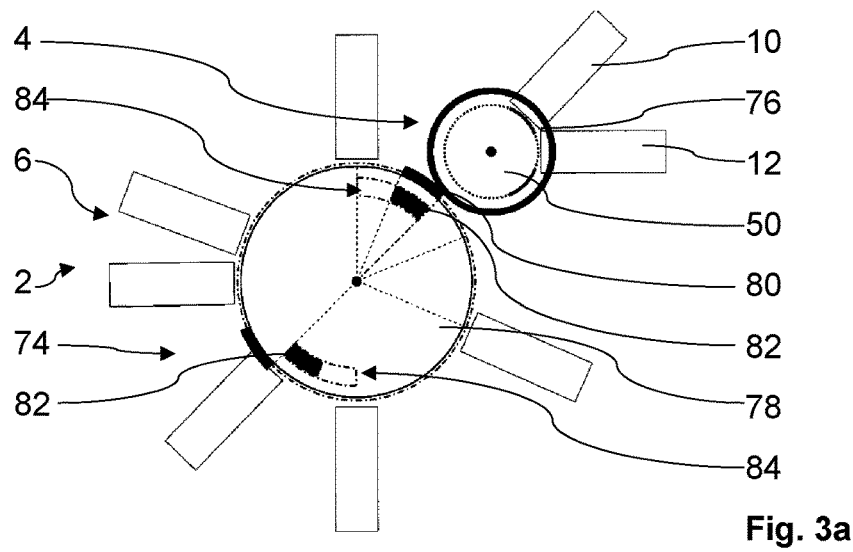
FIGS. 3a to 3h show the exemplary embodiment in a simplified, cut top view.

First of all, the valve system 2 is in the state shown in FIG. 3a. As can be seen from this, the housing opening 10 is blocked by means of the valve body 50 and the housing opening 12 is opened by means of the valve body 50, so that according to FIG. 3a the housing opening 12, depending on the rotational position of the valve body 52 of the second valve 6 about the axis of rotation 48, can be provided with a fluid connection by means of the first valve 4 with at least one of the other housing openings 14 to 24 of housing 8. The aforementioned opening or closing of the housing openings 10, 12 by means of the valve body 50 is symbolized in FIGS. 3a to 3h by two continuous arcs on a dotted circular line.

If the transmitter 78 is rotated clockwise to the right in the image plane of FIG. 3a, the gear 76 of the valve body 50 according to FIG. 3a comes into engagement with the gear segment 80 of the transmitter 78, so that the valve body 50 of the first valve 4 is rotated counterclockwise about the axis of rotation 46. Due to the fact that the protrusions 82 in engagement with the grooves 84 are applied to the transmitter 78 in a power-transmitting manner, the transmitter 78 rotates the valve body 52 of the second valve 6, so that the valve system 2 is as shown in FIG. 3b. In the case of the aforementioned transmission of the valve system 2 from its state according to FIG. 3a to its state according to FIG. 3b, as can be seen from FIGS. 3a and 3b, the housing opening 12 is closed by means of the valve body 50 of the first valve 4 and the housing opening 10 is opened by means of the valve body 50 of the first valve 4. Thus, in its transmission from its state according to FIG. 3a to its state according to FIG. 3b, the valve system 2 is in a first operating state of the valve system 2, in which the valve body 50 of the first valve 4 can be rotated jointly with the valve body 52 of the second valve 6 by means of the coupling device 74. The freewheel arrangement of the coupling device 74 is thus in its power transmission state.

If the valve system 2 is transmitted from the state shown in FIG. 3b to the state shown in FIG. 3c, namely the state in which the valve body 50 is rotated clockwise about the axis of rotation 46 by means of the transmitter 78, the housing opening 12 is opened again by means of the valve body 50 and the housing opening 10 is closed again by means of the valve body 50. However, the valve body 52 of the second valve 6, contrary to what is described above, is not initially rotated. This is because the freewheel arrangement of the coupling device 74 explained above is in its freewheel state, in which the protrusions 82 of the transmitter 78 formed as a disc interact with the valve body 52 of the second valve 6 in a non-power-transmitting, namely torque-transmitting, manner. This freewheel state of the freewheel arrangement of the coupling device 74 continues until the protrusions 82 have reached the other end of the groove 84, as shown in FIG. 3c. As long as the described freewheel state of the freewheel arrangement continues, the rotational position of the valve body 52 of the second valve 6 does not change. Accordingly, the housing openings 14 to 24 opened or closed according to FIG. 3b by means of the valve body 52 remain unchanged, at least until the valve system 2 has reached the state according to FIG. 3c. Thus, at its transmission from its state according to FIG. 3b to its state according to FIG. 3b, the valve system 2 is in a second operating state of the valve system 2, in which the valve body 50 of the first valve 4 can be rotated independently of the valve body 52 of the second valve 6 by means of the coupling device 74.

Figure 3D:
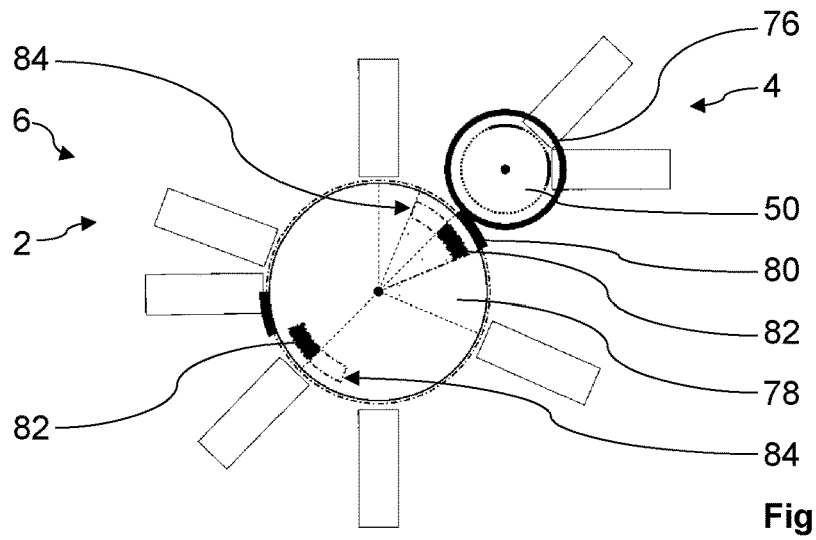

As can be seen from a synopsis of FIG. 3c and FIG. 3d, the valve body 50 is rotated clockwise and counterclockwise about the axis of rotation 46 only to such an extent that the freewheel arrangement remains in the aforementioned freewheel state, i.e., does not exceed a previously determined rotation angle range.

Figure 3E:
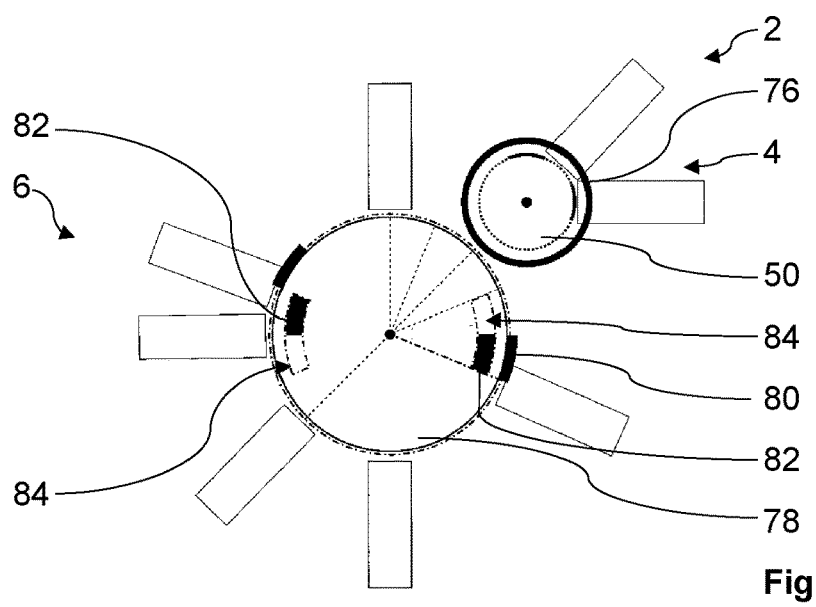
Figure 3F:
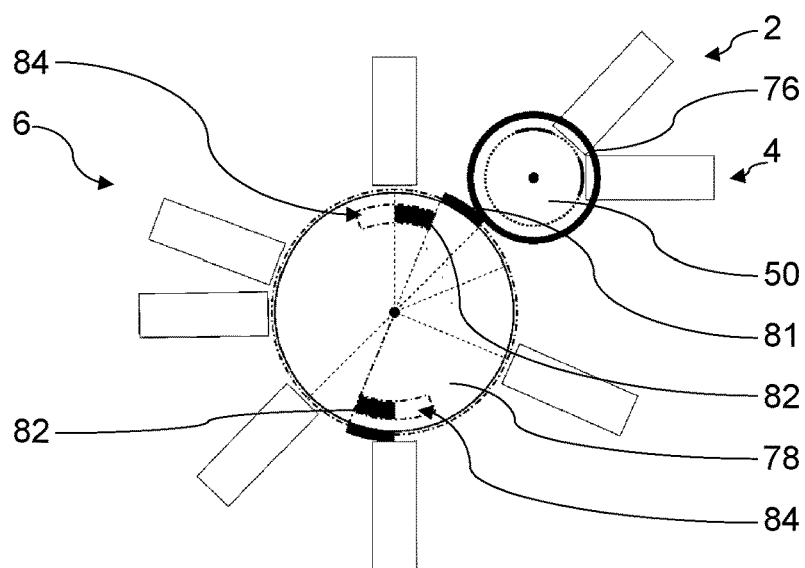
Figure 3G:
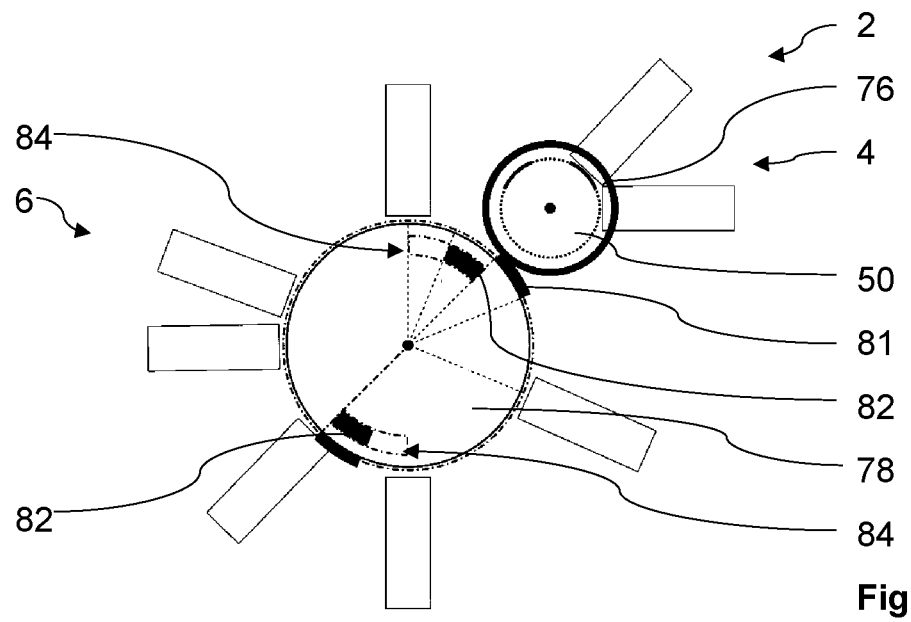
Figure 3H:
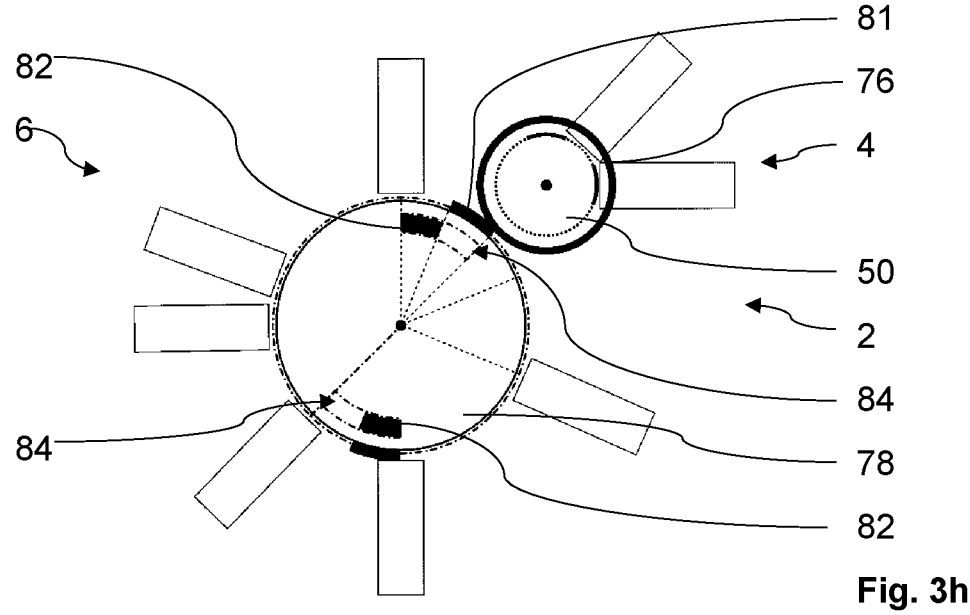

As is further evident from a synopsis of FIGS. 3d to 3f, the valve body 52 of the second valve 6 in the present embodiment can also be rotated independently about the axis of rotation 48 by means of the transmitter 78 of the valve body 50 of the first valve 4. In the case according to FIGS. 3d to 3f, the transmitter 78 and thus the valve body 52 of the second valve 6 is rotated clockwise about the axis of rotation 48 until the gear segment 81 of the transmitter 78 rotating the valve body 52 comes into engagement with the gear 76 of the valve body 50. Thus, at its transmission from its state according to FIG. 3d to its state according to FIG. 3f, the valve system 2 is in the second operating state of the valve system 2, in which the valve body 52 of the second valve 6 can be rotated independently with the valve body 50 of the first valve 4 by means of the coupling device 74.

With a further rotation of the valve body 52 of the second valve 6 clockwise about the axis of rotation 48 results in a coupling or decoupling analogous to the coupling or decoupling of the two valve bodies 50, 52 of the two valves 4, 6 already explained above on the basis of FIGS. 3a to 3c. Accordingly, with regard to FIGS. 3g and 3h, reference can be made to the above embodiments.

Figure 4:
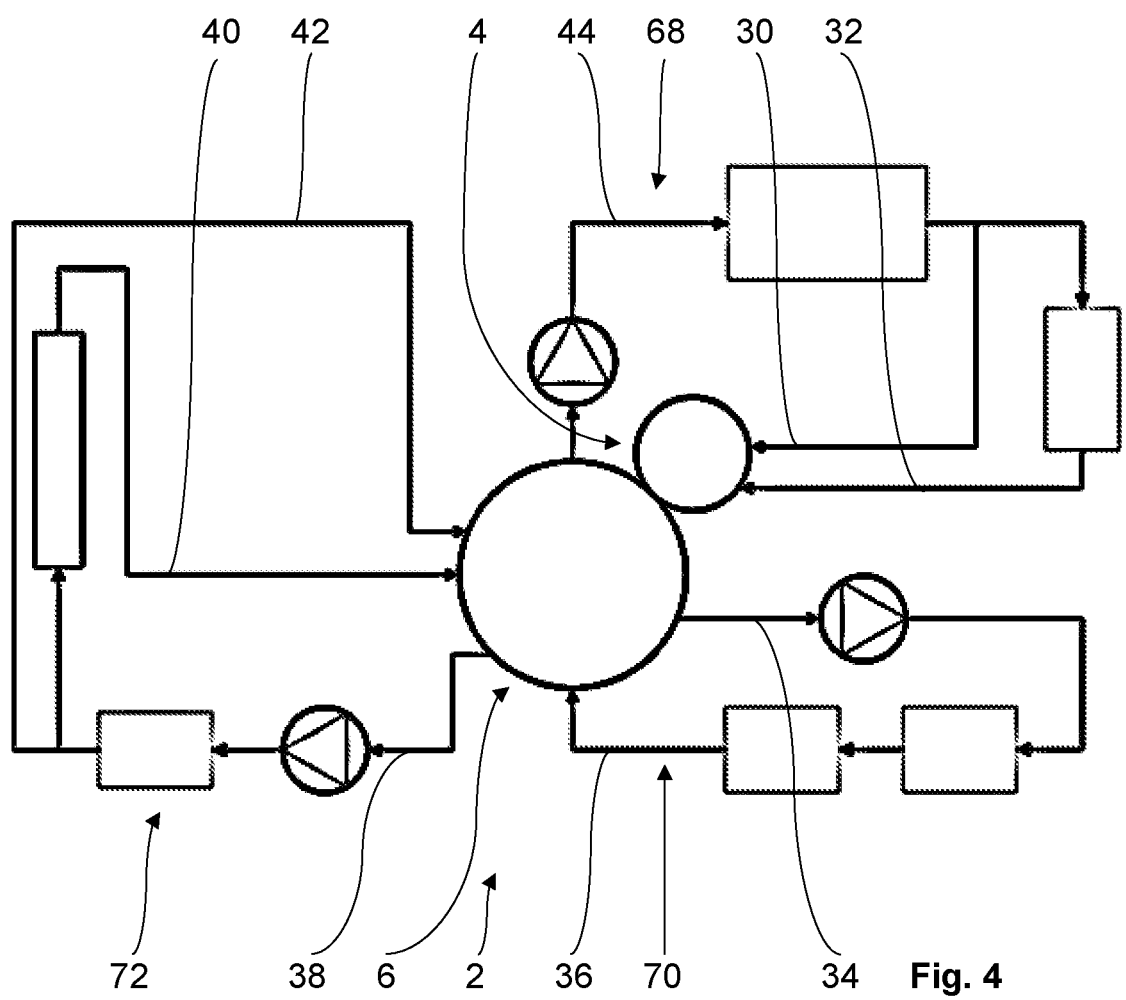
FIG. 4 shows the exemplary embodiment in a process engineering flow chart.

An exemplary process integration of the valve system 2 results from FIG. 4. For example, the valve system 2 is used in the control of complex fluid systems with fluid circuits in vehicles, such as the fluid circuits 68, 70, 72 of the exemplary embodiment. Even newer motor vehicle concepts for land vehicles, such as hybrid or electric cars, have such complex fluid systems with fluid circuits. In the fluid circuits, such as the fluid circuits 68, 70, 72, these may be, for example, cooling circuits and/or heating circuits, wherein the same fluid circuit may be designed simultaneously as a cooling circuit and as a heating circuit. Depending on the operating mode, it may be necessary to close or open, connect or disconnect fluid circuits of such a fluid system. Here, the valve system according to the invention according to the present embodiment is advantageously usable.

FIGS. 5a to 6f show a second exemplary embodiment of the valve system according to the invention purely by way of example and not restrictively. Identical components or components with the same effect are designated with the same reference signs as in the first embodiment. Furthermore, the second embodiment is explained only to the extent of the differences to the first embodiment. Otherwise, reference is made to the first embodiment. It is also possible, for the purpose of forming further variants and embodiments of the valve system according to the invention, to combine individual aspects from the two explained embodiments with each other.

In contrast to the first embodiment, the first valve 4 and the second valve 6 of the second embodiment are arranged on top of each other along a common axis of rotation 46 of the valve bodies 50, 52. In this respect, see FIG. 5a. Unlike the first embodiment, each of the two valve bodies 50, 52 has only a single connection channel 54, 56 for the connection of at least two of the housing openings A to F. The housing openings A to F of the second embodiment are designated differently in FIGS. 5a to 6f for the purpose of easier distinguishability of the two embodiments from the housing openings 10 to 24 of the first embodiment, wherein the housing openings A, B, C are assigned to the first valve 4 and the housing openings D, E, F are assigned to the second valve 6. The valve body 50 with the connection channel 54 is shown in FIGS. 6a to 6f each with solid lines, while the valve body 52 with the connection channel 56 in FIGS. 6a to 6f is each shown with dashed lines.

Figure 5A:
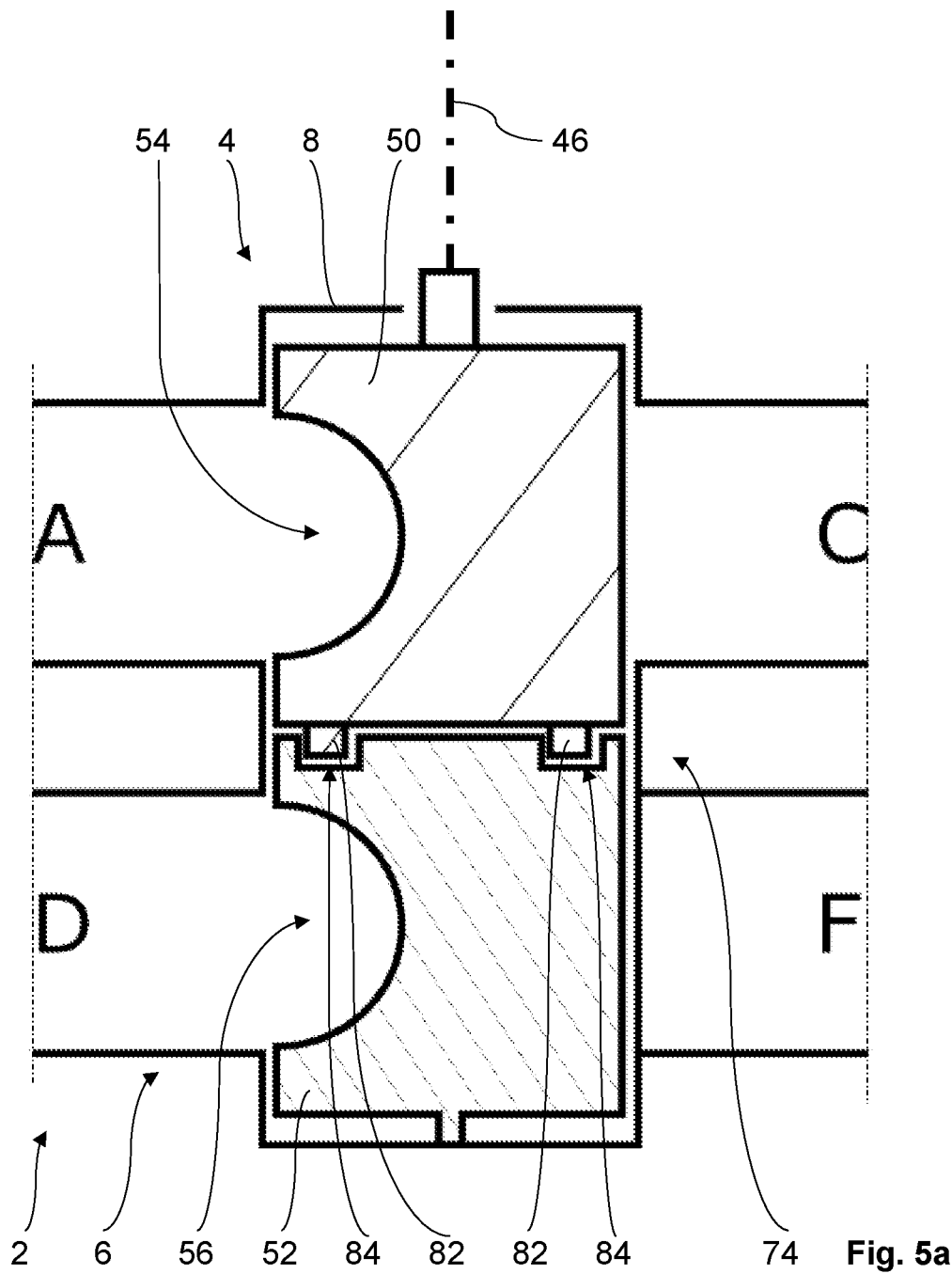
FIG. 5a shows a further example of the valve system according to the invention in a lateral sectional representation.
Figure 5B:
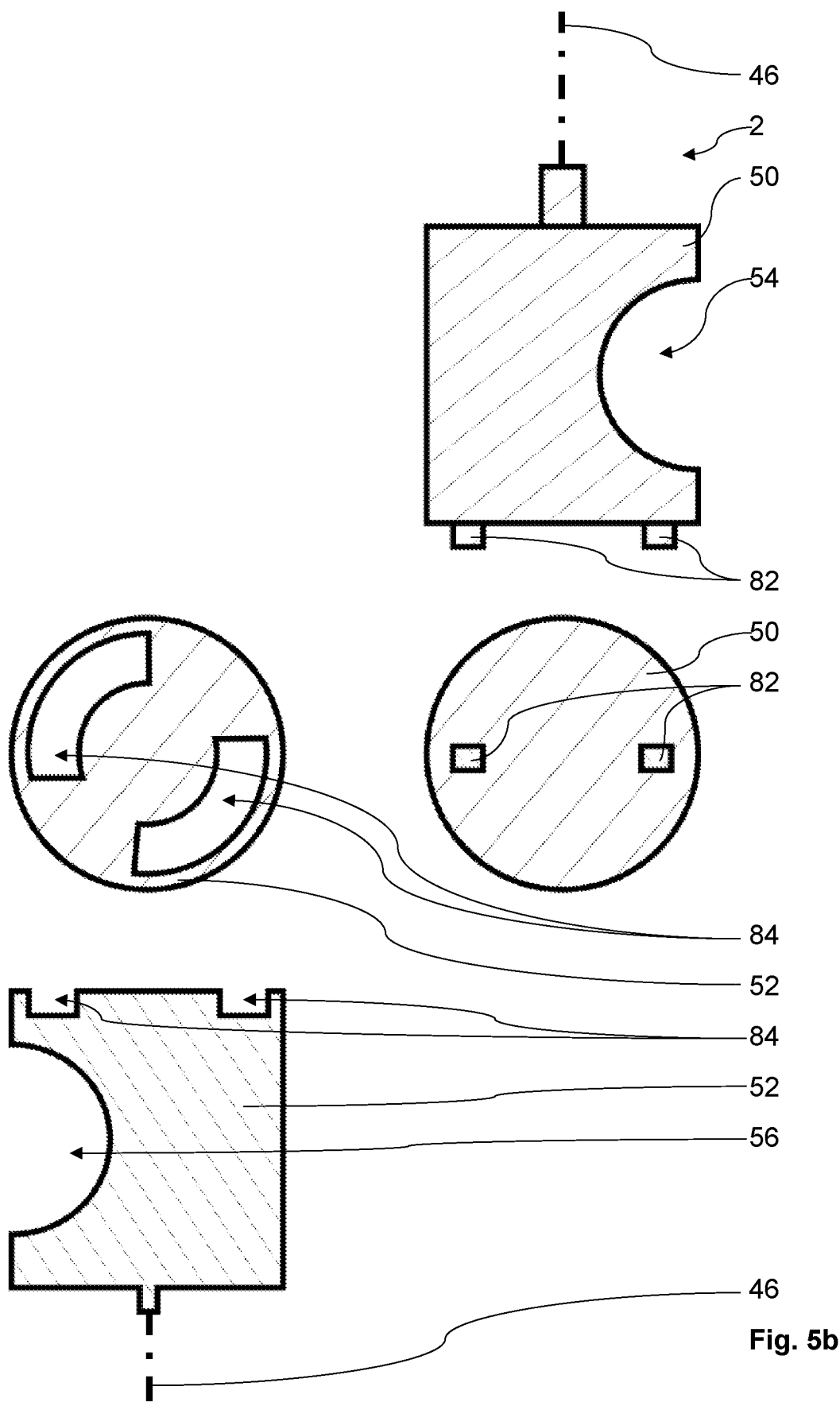
FIG. 5b shows the valve body of the first valve of the further example in a cut side view and in a cut sub-view, and the valve body of the second valve in a cut side view and in a cut top view.

From FIGS. 5a and 5b, the constructive design of the valve system 2 according to the second embodiment, in particular the formation of the coupling device 74, is more closely apparent, wherein the coupling device 74 of the second embodiment is formed analogous to the coupling device 74 of the first embodiment. In contrast to the first embodiment, the protrusions 82 engaging in the grooves 84 are formed directly on the valve body 50 of the first valve 4. Accordingly, there is no need here for a transmitter and a torque-transmitting coupling and decoupling of the transmitter on the one hand on the valve body 50 of the first valve 4 and on the other hand on the valve body 52 of the second valve 6. In the second embodiment, the two valve bodies 50, 52 are directly coupled to each other, namely by means of the protrusions 82 and the grooves 84.

In the following, the functioning of the valve system according to the invention according to the second embodiment is explained in more detail on the basis of FIGS. 5a to 6f, to the extent of the differences to the first embodiment.

Figure 6A:
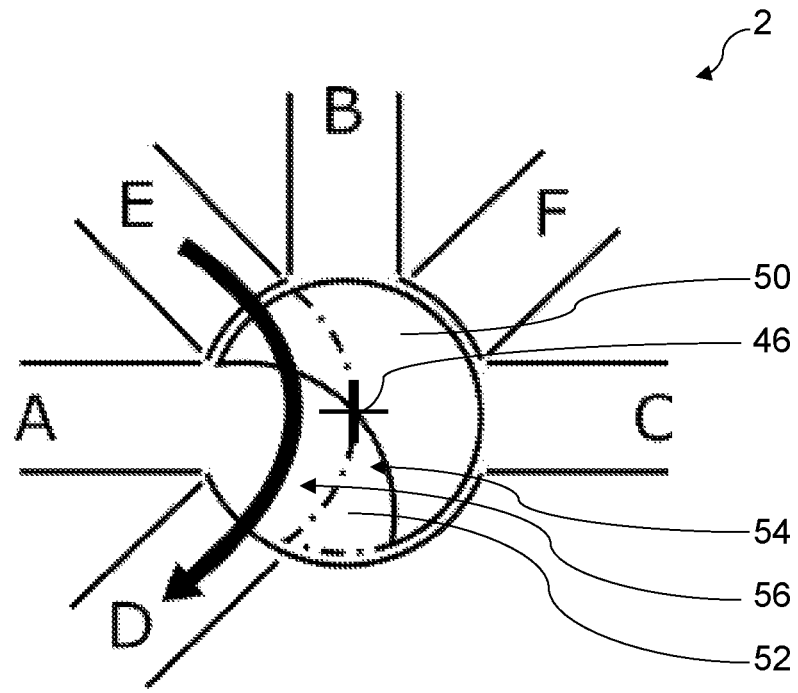
FIGS. 6a to 6f show two cut top views once with a view to the connection channels and once with a view to the coupling device.
Figure 6A:
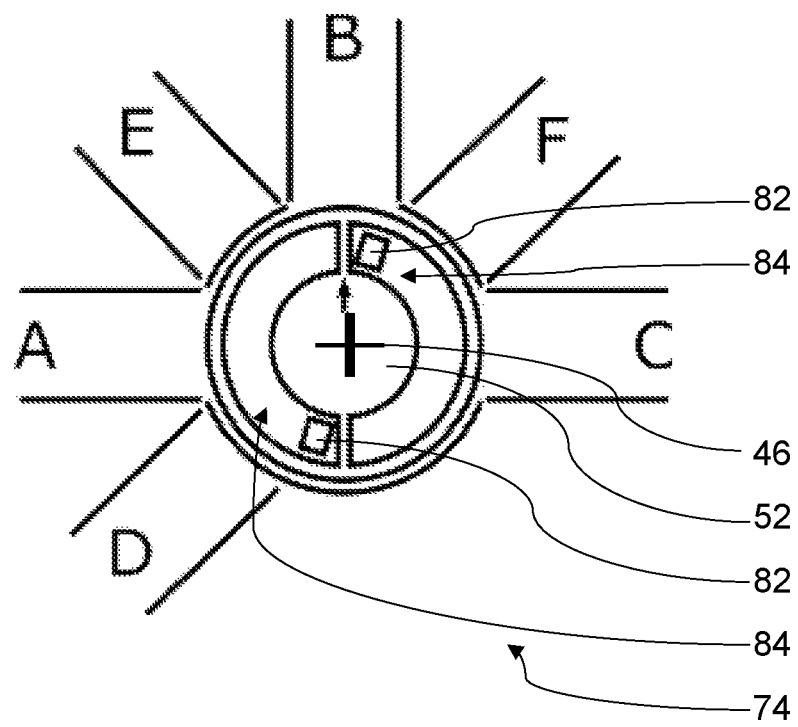
Figure 6B:
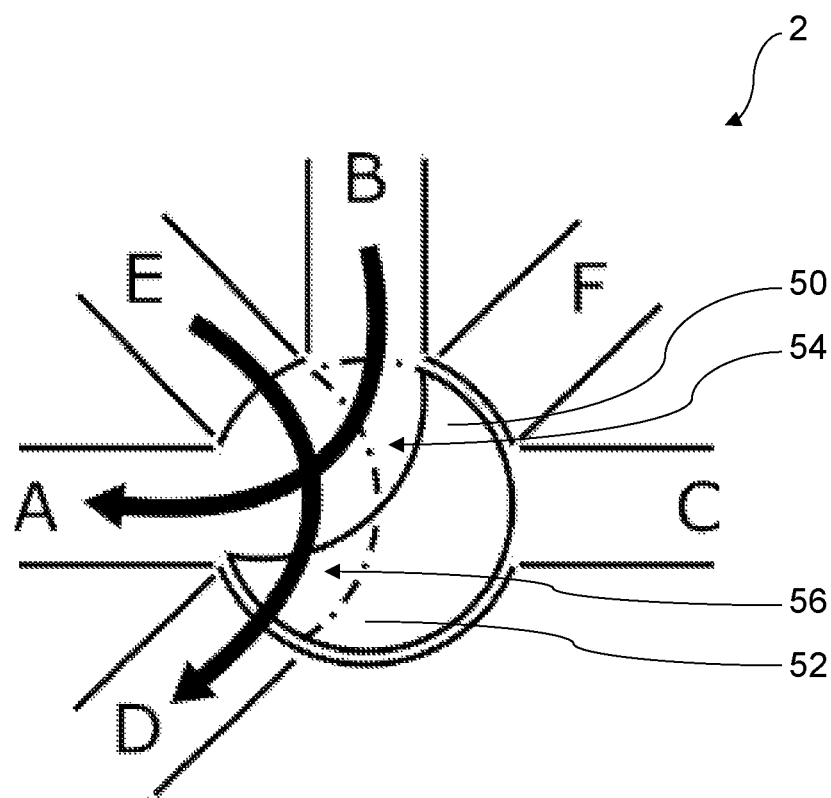
Figure 6B:
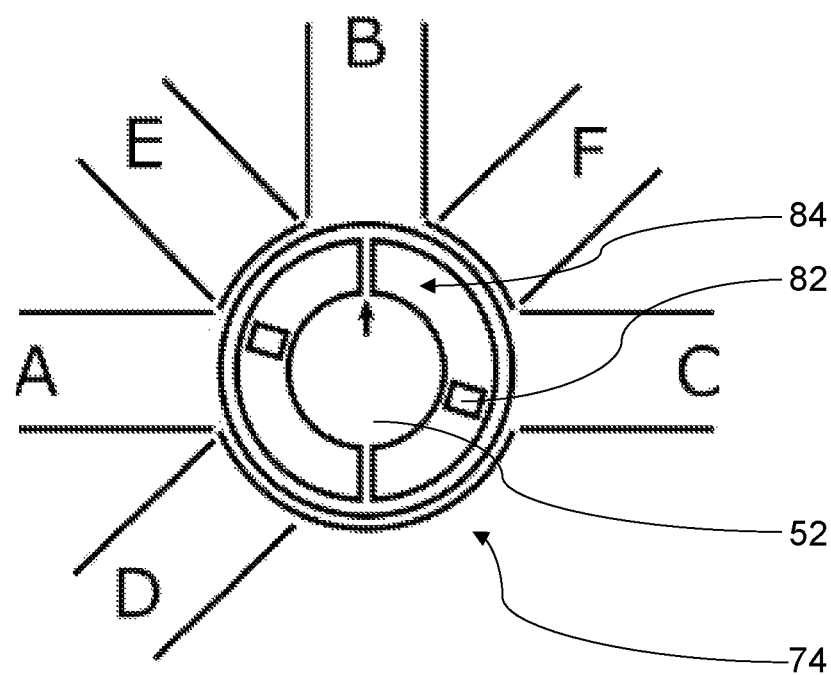

First, the distribution system 2 according to the second embodiment is in the state according to FIG. 6a. As can be seen from this, in this state of the valve system 2, the housing openings E and D are provided with a fluid connection to each other, i.e., coolant connection. All other housing openings A to C and F are not in fluid connection with any further housing opening of the housing openings A to F. As can be seen from the sectional representation shown in the image plane of FIG. 6a below, the two protrusions 82 of the valve body 50 of the first valve 4 are each applied in a power-transmitting manner at one end of the corresponding groove 84 of the valve body 52 of the second valve 6. If the valve body 50 of the first valve 4 would now be rotated counterclockwise about the axis of rotation 46, the valve body 52 of the second valve 6 would also be rotated by means of the coupling device 74.

However, this is not the case. Instead, the valve body 50 of the first valve 4 is rotated clockwise about the axis of rotation 46. In this respect, see FIG. 6b. As can be clearly seen from a comparison of the illustrations arranged above in the respective image plane of FIGS. 6a and 6b, only the valve body 50 of the first valve 4 is rotated about the axis of rotation 46, but not the valve body 52 of the second valve 6. This is because the freewheel arrangement of the coupling device 74 formed by means of the corresponding protrusions 82 and grooves 84 is in its freewheel state, in which no power transmission, namely no torque transmission, takes place between the valve body 50 and the valve body 52. In the aforementioned rotation of the valve body 50, in addition to the housing openings E and D, the housing openings B and A are now in fluid connection with each other.

Figure 6C:
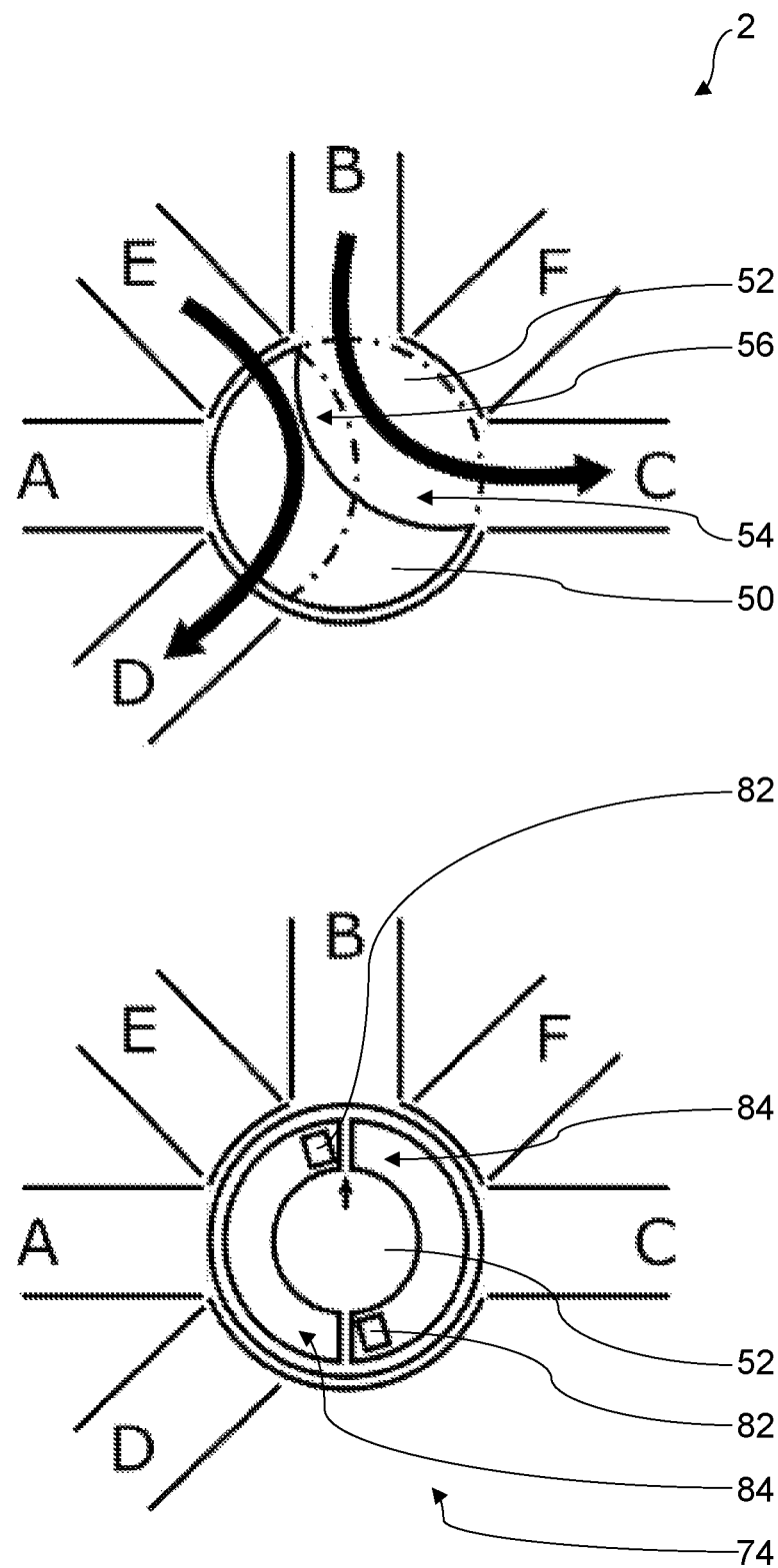
Figure 6D:
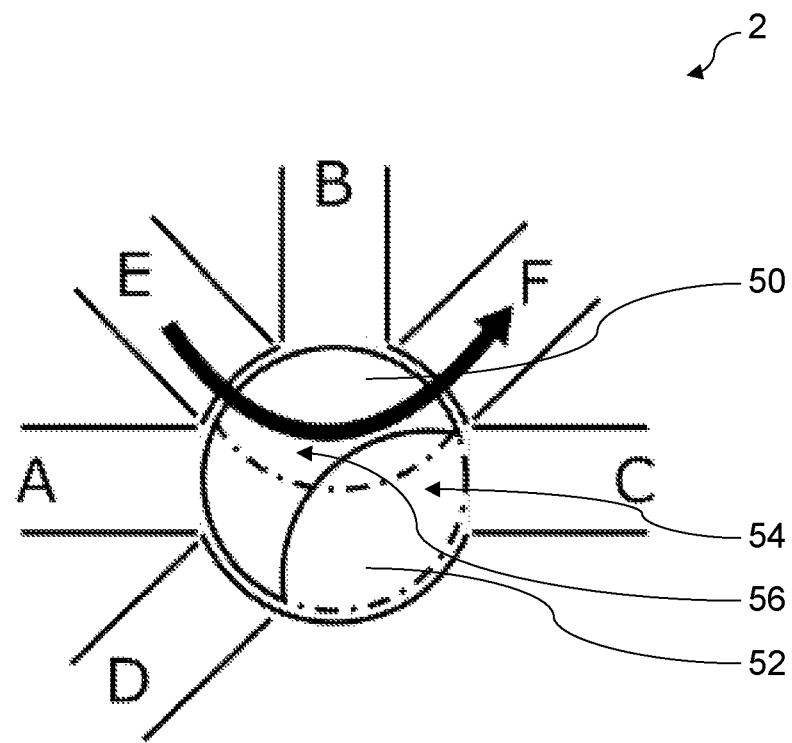
Figure 6D:
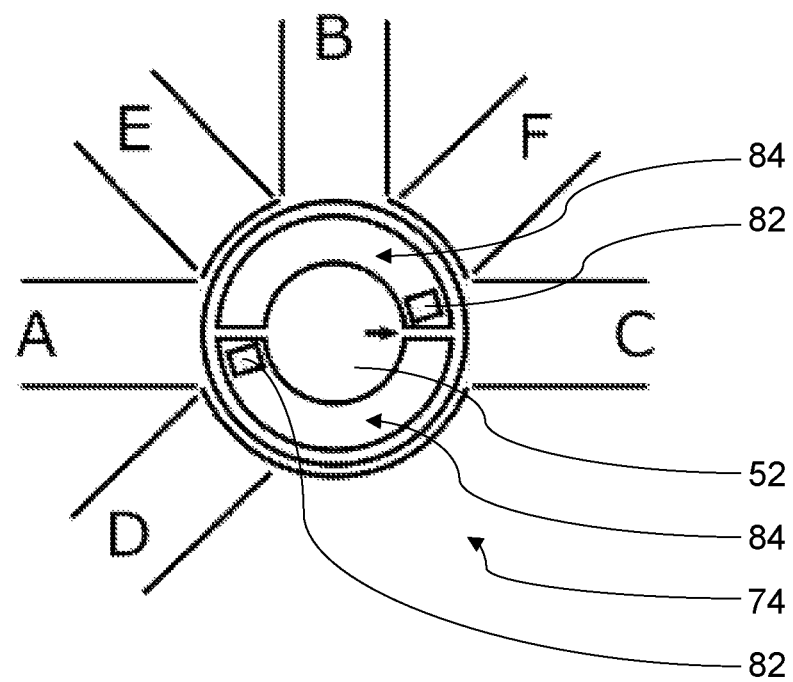
Figure 6E:
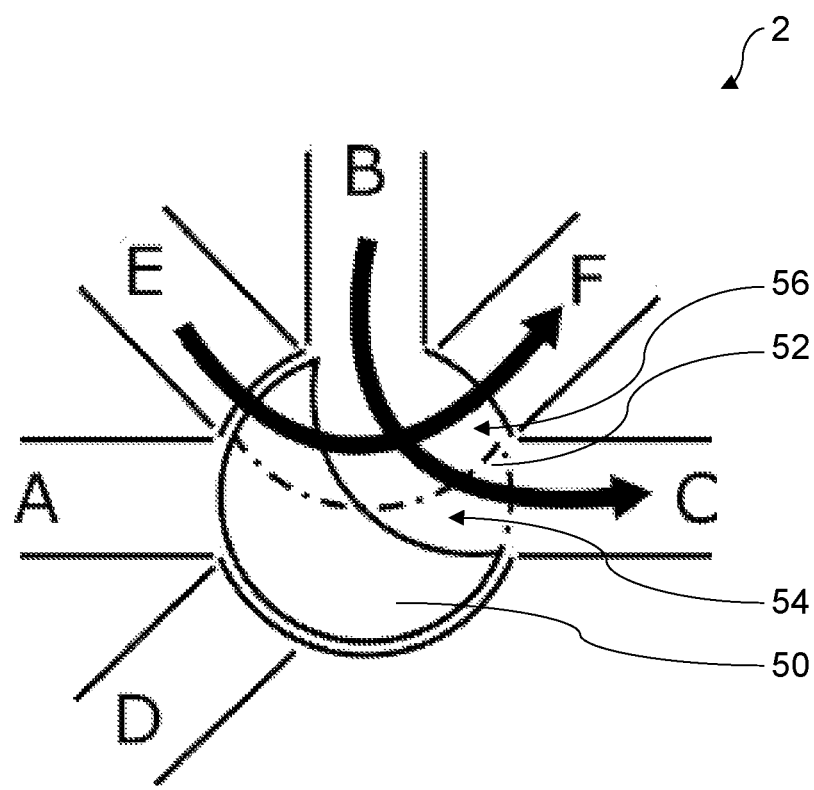
Figure 6E:
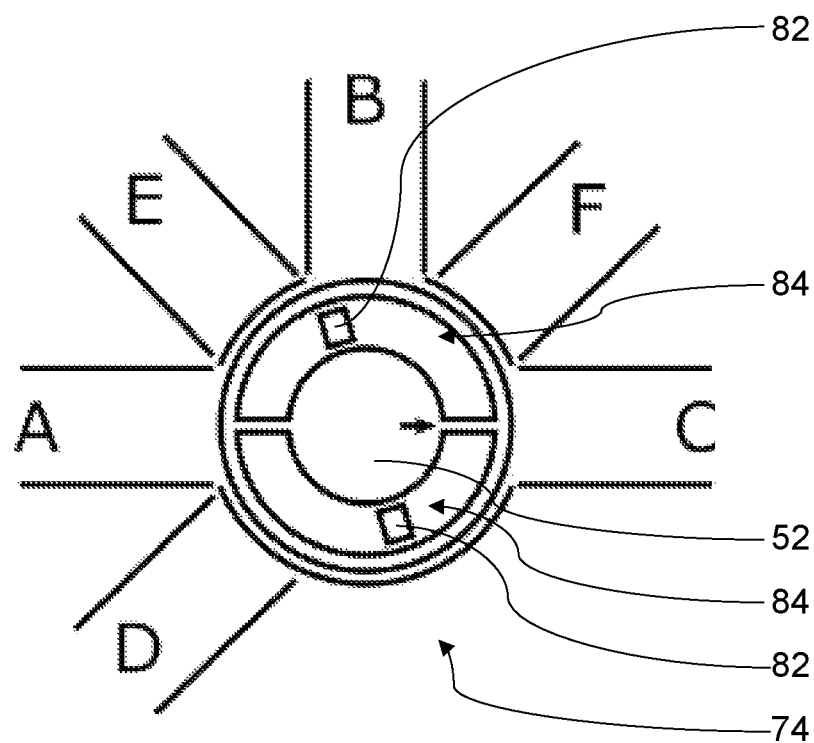
Figure 6F:
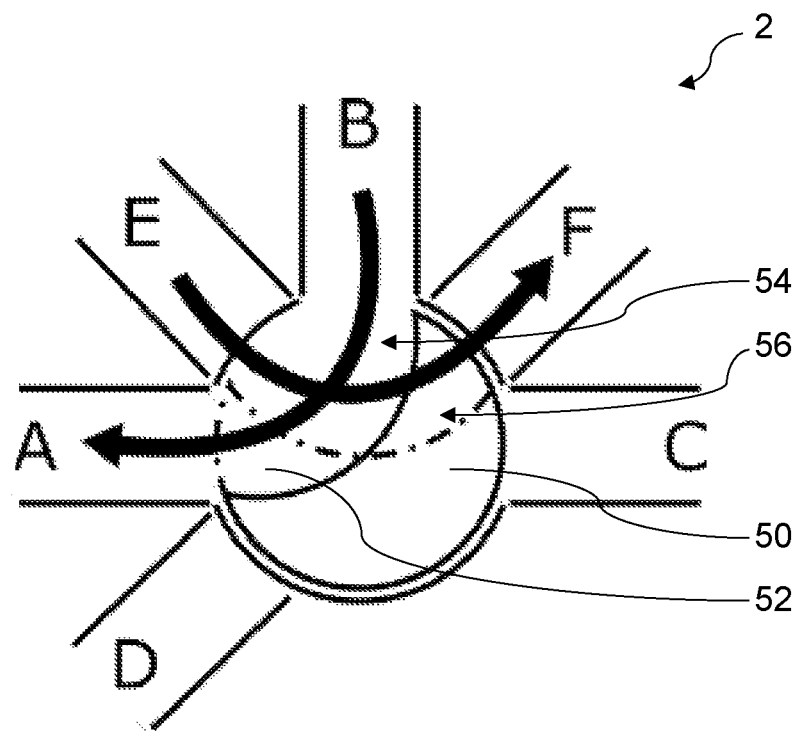
Figure 6F:
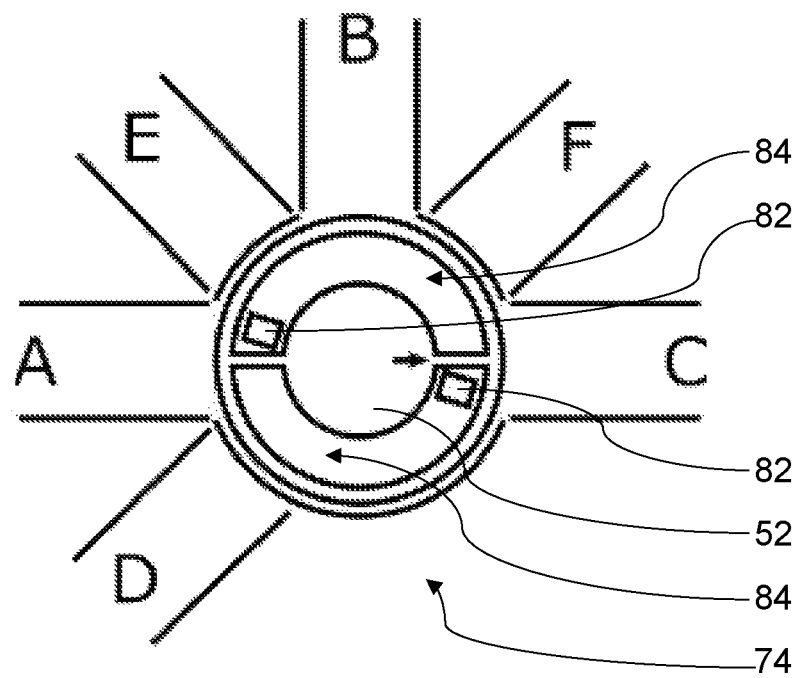

This freewheel state continues until the valve body 50 of the first valve 4 has reached the rotational position shown in FIG. 6c. In the further rotation of the valve body 50, i.e., when the valve system 2 is transmitted from its state according to FIG. 6b to its state according to FIG. 6c, the fluid connection of the housing openings E and D thus remains unchanged, whereas the fluid connection between the housing openings B and A is separated again and instead the housing openings B and C are connected with each other in fluid connection. The two protrusions 82 are now applied to the other two ends of the respective groove 84 in a power-transmitting manner. If the valve body 50 of the first valve 4 is now rotated further clockwise about the axis of rotation 46, the valve body 52 of the second valve 6 is rotated clockwise. See the synopsis from FIGS. 6c and 6d. The freewheel arrangement of the power transmission device 74 is thus in its power transmission state. Due to this co-rotation of the valve body 52 with the valve body 50, the fluid connection between the housing openings E and D is now separated and instead the housing openings E and F are in fluid connection with each other.

By means of a reversal of the direction of rotation, namely a rotation of the valve body 50 of the first valve 4 in a counterclockwise direction about the axis of rotation 46, the freewheel arrangement of the coupling device 74 is again in its already described freewheel state. In this respect, see FIGS. 6d to 6f in a synopsis. In this freewheel state, it is now possible, in the way already described, to provide a fluid connection between the housing openings B and C, in addition to the housing openings E and F. See FIG. 6e. With the further rotation of the valve body 50 in a counterclockwise direction, the fluid connection of the housing openings B and C can be disconnected again and instead, the housing openings B and A are connected with each other. See FIG. 6f. Since the freewheel arrangement of the coupling device 74 is constantly in the freewheel state when the valve system 2 is transmitted from its state according to FIG. 6d to its state according to FIG. 6f, the rotational position of the valve body 52 of the second valve 6 does not change, so that the fluid connection between the housing openings E and F remains unchanged. See FIGS. 6d to 6f in a synopsis.

Due to the inventive formation of the valve system according to the two embodiments, it is thus possible to control a plurality of external flow channels of a fluid system with, for example, a plurality of external fluid circuits in a simple manner in terms of design and circuit engineering. The valve system 2 according to the present embodiments is suitable for a variety of combinations between external fluid-connectable and again separable flow channels for a variety of fluid systems, wherein the design, manufacturing and circuitry effort is reduced. Accordingly, the installation effort and costs as well as the required installation space are significantly reduced.

The invention is not limited to the present embodiments. For example, the valve system according to the invention is advantageously applicable for a variety of applications in the field of automotive engineering and outside automotive technology.

In particular, the invention is not limited to the design and circuit technical details of the present embodiments. For example, embodiments of the valve system according to the invention are conceivable in which the valve body and the housing of the first and/or second valve have corresponding latching agents, wherein the latching agents are designed in such a way that in the freewheel state of the freewheel arrangement, this valve body locks with this housing and that in a power transmission state of the freewheel arrangement in which a torque is transferable between the two valve bodies by means of the coupling device, the locking of the latching agents is released.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A valve system comprising:
   a first valve; and
   a second valve,
   wherein the first and second valves each comprise:
      a housing with a plurality of housing openings to provide a fluid connection with an external flow channel for a fluid; and
      a valve body that is arranged rotatably in the housing and has at least one connection channel for providing a fluid connection between at least two of the housing openings of the housing, wherein between the housing and the valve body, a seal having seal openings corresponding to the housing openings in the housing is arranged for sealing the fluid connections from an open environment,
   wherein the valve body of the first valve and the valve body of the second valve are mechanically coupled with each other by a coupling device of the valve system, and
   wherein the coupling device is designed such that the valve bodies are adapted to be rotated jointly by the coupling device when the valve system is in a first operating state and are each adapted to be rotated independently by the coupling device when the valve system is in a second operating state.

2. The valve system according to claim 1, wherein the coupling device has a freewheel arrangement, which is designed such that when the valve bodies are in a freewheel state of the freewheel arrangement, a rotation of the valve bodies about respective axes of rotation are not connected during a predetermined angle of rotation range in terms of torque.

3. The valve system according to claim 2, wherein, the valve body and the housing of the first and/or second valve have a corresponding latch, wherein the latch is designed such that the valve body is locked in the freewheel state of the freewheel arrangement with the housing, and in a power transmission state of the freewheel arrangement, in which by means of the coupling device a torque between the valve bodies is adapted to be transmitted, the locking of the latch is released.

4. The valve system according to claim 2, wherein the axes of rotation include a first axis of rotation and a second axis of rotation which are different from one another and wherein the valve body of the first valve rotates about the first axis of rotation and the valve body of the second valve rotates about the second axis of rotation.

5. The valve system according to claim 2, wherein the freewheel arrangement has at least one groove and at least one protrusion that corresponds to the at least one groove and engages in the at least one groove, and wherein the at least one groove is arranged on one of the valve bodies and the at least one protrusion is each arranged on the other of the valve bodies and/or on at least one transmitter connected with at least one of the valve bodies in a power-transmitting manner.

6. The valve system according to claim 5, wherein the at least one protrusion protrudes from the other of the valve bodies and/or from the at least one transmitter in a direction that is parallel to the respective axes of rotation.

7. The valve system according to claim 1, wherein the coupling device has at least one gear pairing with a first gear and a second gear, wherein the first gear is arranged on one of the valve bodies and the second gear is arranged on the other of the valve bodies and/or on at least one transmitter connected with at least one of the valve bodies in a power-transmitting manner.

8. The valve system according to claim 1, wherein the first valve and/or the second valve is designed as a multi-way valve, wherein at least one of the at least one connection channel of the multi-way valve is formed as a curved or arc-shaped recess of the valve body.

9. The valve system according to claim 8, wherein the multi-way valve has at least one plane with a plurality of the at least one connection channel, wherein one of the at least one connection channel of the at least one plane is formed as a central channel, and wherein remaining connection channels of the at least one plane are arranged on both sides of the central channel.

10. The valve system according to claim 9, wherein the at least one plane of the multi-way valve includes a plurality of planes, wherein individual planes of the plurality of planes are arranged parallel to each other with at least one of the at least one connection channel extending over at least two planes, and wherein the at least one of the at least one connection channel being the central channel.

11. The valve system according to claim 1, wherein the valve system is designed such that via the valve system substantially simultaneously three external fluid circuits are controllable, wherein each of the three external fluid circuits is provided with a fluid connection to at least two different housing openings by the external flow channels, wherein at least one of the three external fluid circuits has an external flow channel formed as a bypass channel for at least one component of the at least one of the three external fluid circuits, and wherein the bypass channel is separately provided with a fluid connection to one of the housing openings of the valve system.

12. The valve system according to claim 1, wherein the housing of the first valve and the housing of the second valve are at least partially or completely formed as a common housing.

* * * * *